H. KALLER.
Corn-Planter.
No. 21,969.                                        Patented Nov. 2. 1858.
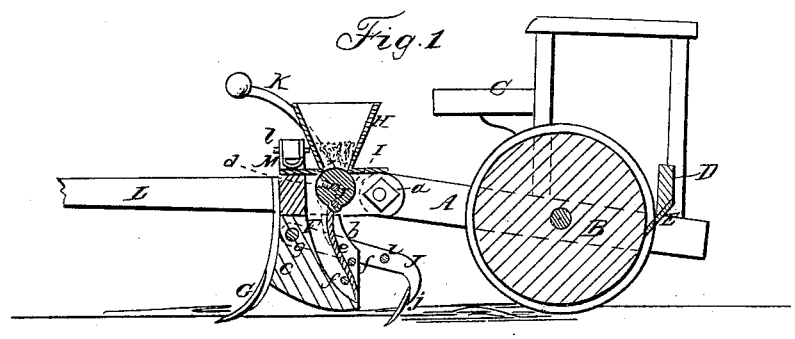
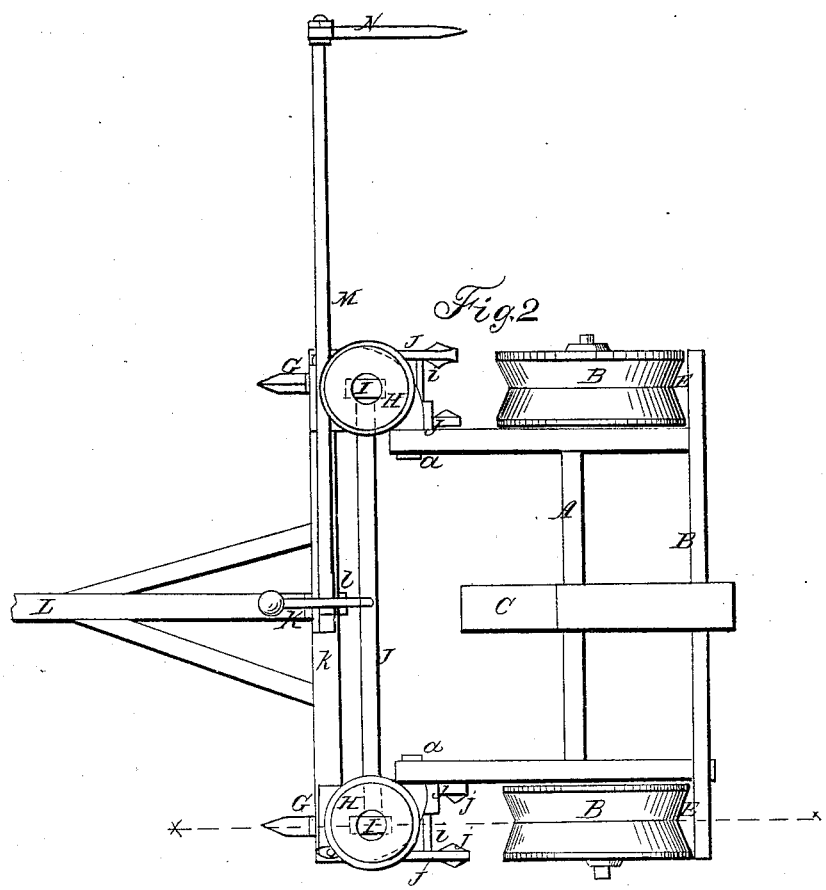

UNITED STATES PATENT OFFICE.

HERMANN KALLER, OF PERRY, ILLINOIS.

IMPROVEMENT IN SEEDING-MACHINES.

Specification forming part of Letters Patent No. 21,969, dated November 2, 1854.

*To all whom it may concern:*

Be it known that I, HERMANN KALLER, of Perry, in county of Pike and State of Illinois, have invented a new and Improved Seeding-Machine; and I do hereby declare that the following is a full, clear, and exact description of the same, reference being had to the annexed drawings, making a part of this specification, in which—

Figure 1 is a vertical section of my invention, taken in the line $x\ x$, Fig. 2. Fig. 2 is a plan or top view of the same.

Similar letters of reference indicate corresponding parts in the two figures.

This invention consists in the employment or use of a peculiar seed-distributing device, arranged as hereinafter fully shown and described, whereby a very simple and efficient seeding-machine is obtained, and one that may be operated by any person of ordinary capacity with great facility, and so as to perform the desired work—to wit, planting in check-rows—in a perfect manner.

To enable those skilled in the art to fully understand and construct my invention, I will proceed to describe it.

A represents a frame, which is mounted on two wheels, B B, having concave or grooved peripheries.

C is the driver's seat, attached to the center of the frame A, and D is a traverse-bar, attached to the back part of the frame A, and having a scraper, E, at each end, which fits in the grooved peripheries of the wheels B B and keeps the same open or free from earth. This will be clearly understood by referring to Fig. 1.

To the front part of the frame A, and at each side, a tube, F, is attached, said tubes being secured to the frame by bolts $a$. These tubes may be formed by having metal plates $b$ attached to wooden standards $c$, the plates $b$ projecting back of the standard so as to form the tube.

To the front sides of the standards $c$ furrow-shares G are attached, one to each, and at the upper part of each tube F a hopper, H, is placed.

Directly below each hopper H a cylinder, I, is placed, and both cylinders are placed on opposite ends of a shaft, J, which extends across the machine. The cylinders I I are partly within the tube F, and each cylinder has a recess, $d$, made in its periphery.

To the lower part of each cylinder I a slide, $e$, is pivoted. These slides are of curved form, and extend down between the back parts of the plates $b$, and form the backs of the tubes F. The lower parts of the slides $e$ work between horizontal rods $f$ in the lower parts of the tubes, said rods $f$ serving as guides.

To each side of each tube F a curved bar, J, is attached by a pivot, $g$. These bars extend some distance back of the tubes F, and each pair is connected by a traverse-bar, $i$. The back end of each bar has a covering-share, $j$, formed on it.

To the center of the shaft J a handle, K, is attached.

L is the draft-pole, attached to a bar, $k$, which is connected to the two tubes F F.

To the center of the bar $k$ one end of a rod, M, is pivoted or connected by a joint, $l$. This bar has a rod or marker, N, attached loosely to its end.

The operation is as follows: As the machine is drawn along the furrow-shares G G open the furrows, and the attendant or driver on seat C actuates the handle K so as to drop the seed at the proper time. When the handle K is drawn back the seed cells or recesses $d$ are brought underneath the hoppers H H, and they of course fill with seed, and as the cylinders I I thus turn the slides $e$ rise, as shown in red, and when the handle K is shoved outward from the operator the cells or openings $d$ pass downward in the tubes F, and the seed in the cells falls to the bottom of the tubes, the slides $e$ closing as the cylinders I are turned outward to drop the seed into the tubes. The seed previously dropped into the bottoms of the tubes is allowed to pass out of the tubes F into the furrows as the recesses or cells $d$ are turned back underneath the hoppers to be refilled. The covering-shares $j$ cover the seed, and the wheels B press the earth firmly on the seed, leaving a convex ridge.

This seeding-machine may be operated by any person without difficulty. The parts are few and simple, and cannot readily get out of order or repair. The marker N designates the distance between the rows, so that they will all be at equal distances apart.

I do not claim providing the wheels B with concave peripheries, for that has been previously done to effect the purpose herein stated. Neither do I claim the marker N, attached to the reversible bar or rod M; but,

Having thus described my invention, what I claim as new, and desire to secure by Letters Patent, is—

The cylinders I I, provided with the seed-cells $d$, having the slides $e$ attached and arranged within the tubes F and relatively with the hoppers H, to operate as and for the purpose set forth.

HERMANN KALLER.

Witnesses:
 GOTTFRIED WENZEL,
 FRANK FIFIELD.